United States Patent [19]

Hagiya et al.

[11] Patent Number: 4,717,209

[45] Date of Patent: Jan. 5, 1988

[54] ANTI-SKID CONTROL SYSTEM FOR MOTOR VEHICLES

[75] Inventors: Naoyuki Hagiya, Ageo; Yuji Matsubara, Kazo; Katsuya Miyake, Ageo; Hideo Akima, Yokohama; Akira Hoashi, Munakata, all of Japan

[73] Assignees: Akebono Brake Industry Co., Ltd., Tokyo; Fujitsu Limited, Kanagawa, both of Japan

[21] Appl. No.: 947,188

[22] Filed: Dec. 29, 1986

[30] Foreign Application Priority Data

Dec. 27, 1985 [JP] Japan .................. 60-292996

[51] Int. Cl.[4] ................ B60T 8/64; B60T 8/60
[52] U.S. Cl. ..................... 303/111; 303/103; 303/110
[58] Field of Search ........... 188/181 A; 303/96, 97, 303/103, 106, 110, 111; 364/426

[56] References Cited

U.S. PATENT DOCUMENTS

4,652,060  3/1987  Miyake .................. 303/111

Primary Examiner—Andres Kashnikow
Assistant Examiner—T. Newholm

[57] ABSTRACT

An anti-skid control system for motor vehicles is provided wherein the higher one of the lefthand and righthand rear wheels is selected as a first computed speed; the lower one of the above two wheel speeds is selected as a second computed speed; the lower one of the first computed speed and lefthand front wheel speed is selected as a third computed speed; the lower one of the first computed speed and righthand front wheel speed is selected as a fourth computed speed; and a reference speed is set up on the basis of the first computed speed in such a manner that it is lower than the first computed speed by a predetermined amount and follows the first computed speed with such a speed difference. Reduction of brake pressure which has been increased, is started on the basis of the third or fourth computed speed; and in the case where the second computed speed being decelerated, goes below the reference speed, the reduction of the brake hydraulic pressure is stopped at time when the second computed speed which is now being increased as the result of the brake pressure reduction goes above the reference speed, and thereupon buildup of the brake pressure is started.

3 Claims, 6 Drawing Figures

ANTI-SKID CONTROL SYSTEM FOR MOTOR VEHICLES

BACKGROUND OF THE INVENTION

1. Field of the Invention

This invention relates to an anti-skid control system for motor vehicles, which is capable of preventing the wheels of the motor vehicle from skidding during braking operation. More particularly, the present invention is directed to such a system usable with automotive brake equipment having an X-type two-channel system brake oil hydraulic piping arrangement which comprises two, a first and a second, brake oil hydraulic channels arranged in such a manner that anti-skid control with respect to the lefthand front wheel and righthand rear wheel is effected through the first brake oil hydraulic channel while anti-skid control with respect to the righthand front wheel and lefthand rear wheel is effected through the second brake oil hydraulic channel.

2. Description of the Prior Art

Generally, with an anti-skid control system for motor vehicles, anti-skid control is effected by means of microcomputers such that hold valves and decay valves comprising eletromagnetic valves are opened and closed on the basis of electrical signals representing wheel speeds sensed by wheel speed sensors, thereby increasing, holding or reducing the brake pressure, for the purpose of securing improved steering performance and running stability of the motor vehicle, while at the same time shortening the braking distance.

Figure 1:
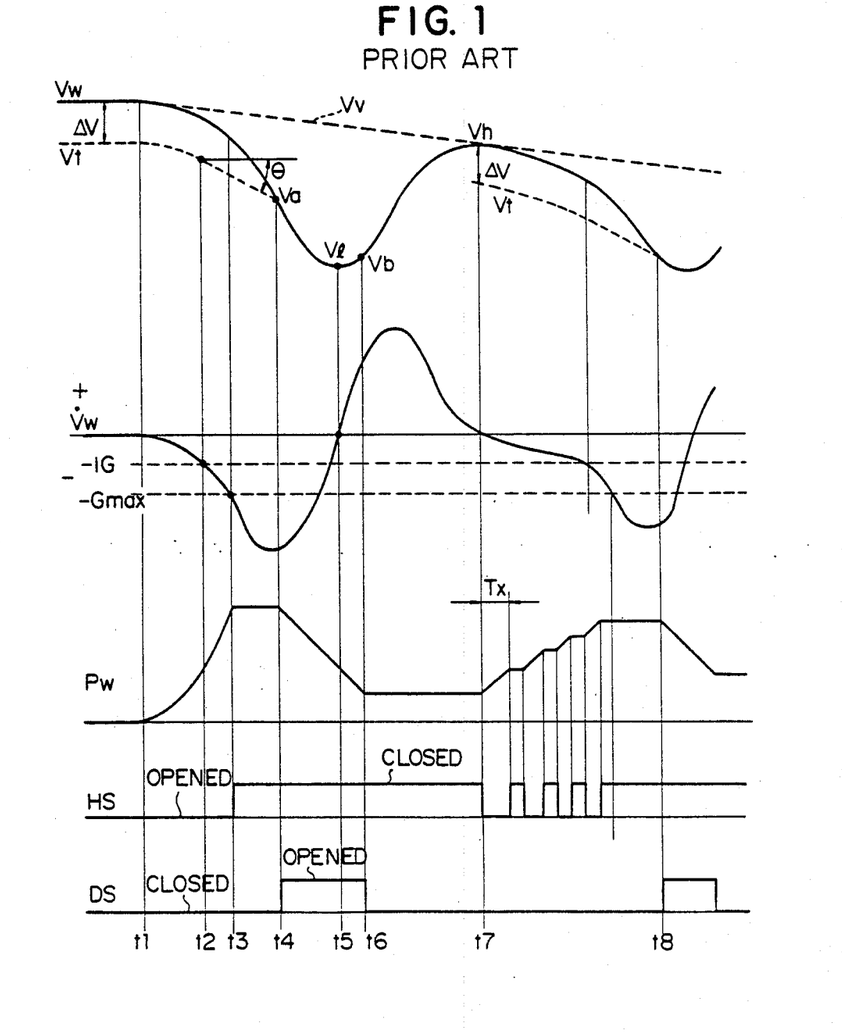
FIG. 1 is a view useful for explaining the operation of the prior-art anti-skid control system.

FIG. 1 of the accompanying drawings illustrates, by way of example, manners in which wheel speed Vw, wheel acceleration and deceleration $+\dot{V}w$, $-\dot{V}w$ and brake pressure Pw are varied during the operation of the conventional anti-skid control system, together with hold signal HS and decay signal DS for opening and closing hold valves and decay valves.

When the brake equipment of the motor vehicle is not operated while the motor vehicle is running, the hold valves remain open while the decay valves remain closed, and the brake pressure Pw is not increased; and when the brake equipment is operated, the brake pressure Pw is increased at time t1 so that the wheel speed Vw is decreased. A reference wheel speed Vt is set up which is lower by a predetermined amount $\Delta V$ than the wheel speed Vw and follows the latter with such a speed difference. More specifically, the reference wheel speed Vt is set up so that when the deceleration (negative accleration) $-\dot{V}w$ of the wheel reaches a predetermined threshold level, say $-1$ G at time t2, the reference wheel speed Vt is thereafter made to linearly decrease with a deceleration gradient of $-1$ G. At time t3 when the deceleration $-\dot{V}w$ of the wheel reaches a predetermined maximum value $-Gmax$, the hold signal HS is interrupted so that the hold valves are closed, thus holding the brake pressure Pw.

Because of the brake pressure Pw being held, the wheel speed Vw is further decreased. At time t4, the wheel speed Vw and the reference wheel speed Vt become equal to each other, and decay signal DS is generated, by which the decay valves are opened so that reduction of the brake pressure Pw is started. As a result of this reduction of the brake pressure Pw, the wheel speed Vw is changed from deceleration to accelleration, at time t5 when a low peak Vl of the sheel speed Vw occurs. Either at the time t5 or at time t6 when the wheel speed Vw is increased up to the level of a speed Vb that is higher than the low peak by 15% of the difference A between the wheel speed Va occurring at the time t4 when the reduction of the brake pressure is started, and the low-peak speed Vl, the decay signal DS is interrupted, and as a result the decay valves are closed so that the reduction of the brake pressure Pw is stopped and thus the brake pressure is held. (In FIG. 1, there is shown the case where the decay signal DS is interrupted at the time t6.) The wheel speed Vw is further increased and a high peak thereof is reached at time t7; thereupon, the brake pressure Pw is again increased. In this case, the buildup of the brake pressure Pw is effected in such a manner that the brake presure Pw is alternately increased and held in succession by the fact that the hold signal is turned on and off mincingly so that the brake pressure Pw is caused to gradually build up. In this way, the wheel speed Vw is decreased, and at time t8, the mode for reduction of the brake pressure occurs again. The brake pressure increasing, holding and reducing modes are effected in combination as mentioned above, and thus the wheel speed Vw can be controlled so that the vehicle speed can be decreased, while the wheels of the motor vehicle are prevented from being locked.

Figure 2:
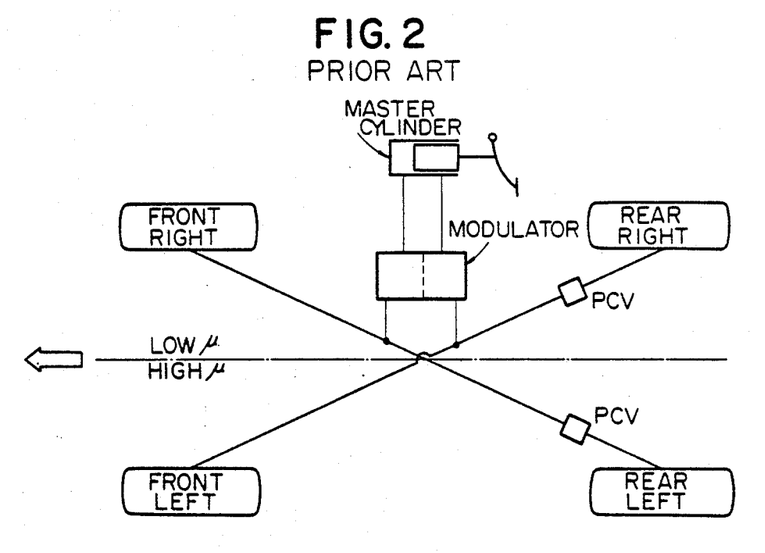
FIG. 2 is a schematic view showing an X-type two-channel system brake oil hydraulic piping arrangement.

In an attempt to apply the above-described anti-skid control system to a motor vehicle incorporating such an X-type brake oil hydraulic piping arrangement as shown in FIG. 2 wherein the lefthand front wheel and righthand rear wheel are controlled through a first oil hydraulic channel common thereto while the righthand front wheel and lefthand rear wheel are controlled through a second oil hydraulic channel common thereto, it has heretofore been the practice that brake control is effected on the basis of the lower one of the wheel speeds of the two wheels associated with the same brake oil hydraulic channel (referred to as "select low" system hereinafter just for the sake of convenience) or alternatively that the control is effected on the basis of the higher one of such two wheel speeds (referred to "select high" system hereinafter also just for the sake of convenience).

With the "select low" system, however, when the lefthand wheels running road surface and righthand wheels running road surface represent different friction coefficients (referred to as "split friction ($\mu$)" hereinafter), the wheels running on the lower friction road surface can be prevented from being locked, while the wheels running on the higher friction road surface cannot be provided with sufficient braking force so that the braking distance tends to increase, since the control is effected on the basis of the rotaional speed of the wheels running on the lower friction road surface. With the "select high" system, on the other hand, since control is effected on the basis of the rotational speed of the wheels running on the higher friction road surface, the braking distance becomes shorter than that with the "select low" system, but the wheels running on the lower friction road surface tend to be locked so that there is the tendency that such a condition that the brake works on the wheels on one side alone, occurs and thus the directional stability of the motor vehicle is lost.

SUMMARY OF THE INVENTION

Therefore, it is an object of the present invention to provide a novel and improved anti-skid control system for motor vehicles having an X-type two-channel system brake oil hydraulic piping arrangement, the system being designed such that even when the lefthand wheels running road surface and righthand wheels running road surface represent different friction coefficients, directional stability of the motor vehicle can be secured during braking operation, while at the same time the braking distance can be shortened.

Briefly stated according to the present invention, the higher one of the lefthand and righthand rear wheels is selected as a first computed speed; the lower one of the above two wheel speeds is selected as a second computed speed; the lower one of the first computed speed and lefthand front wheel speed is selected as a third computed speed; the lower one of the first computed speed and righthand front wheel speed is selected as a fourth computed speed; and a reference speed is set up on the basis of the first computed speed in such a manner that it is lower than the first computed speed by a predetermined amount and follows the first computed speed with such a speed difference. Reduction of brake pressure which has been increased, is started on the basis of the third or fourth computed speed; and in the case where the second computed speed being decelerated, goes below the reference speed, the reduction of the brake hydraulic pressure is stopped at time when the second computed speed which is now being increased as the result of the brake pressure reduction goes above the reference speed, and thereupon buildup of the brake pressure is started.

Other objects, features and advantages of the present invention will become apparent from the ensuing description taken in conjunction with the accompanying drawings.

DESCRIPTION OF THE PREFERRED EMBODIMENTS

Figure 3:
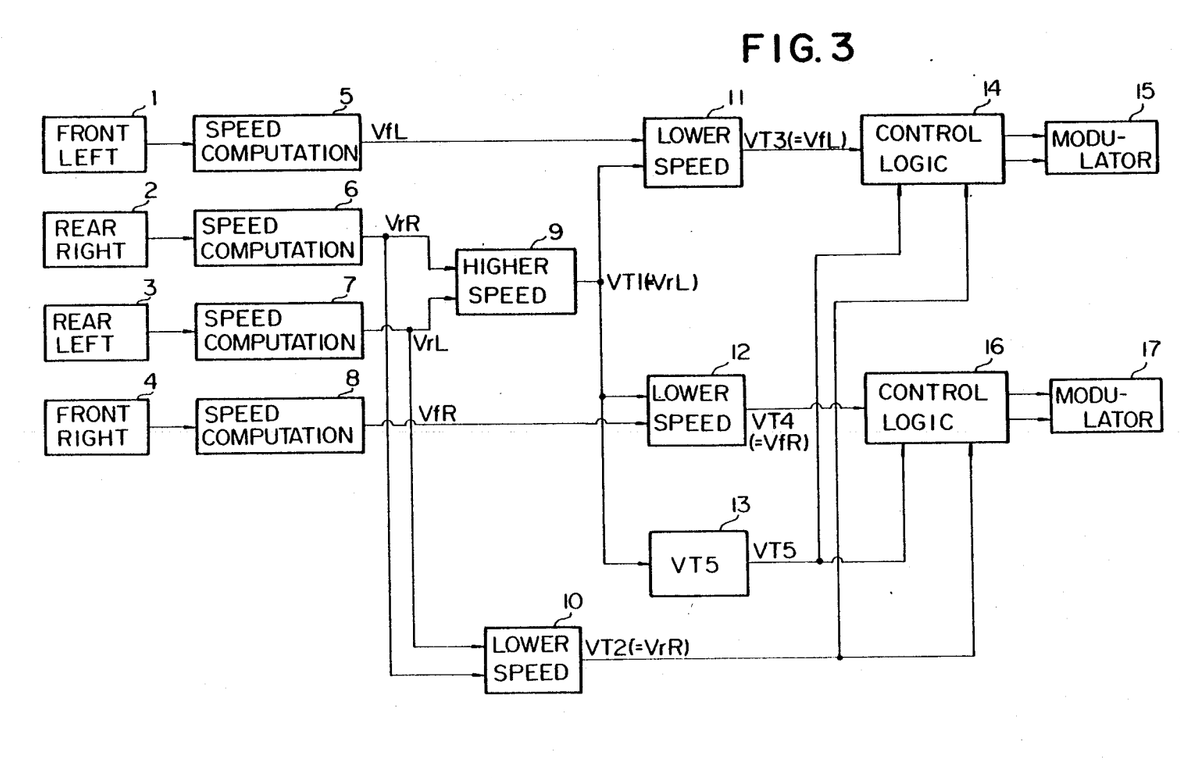
FIG. 3 is a block diagram showing the anti-skid control system according to an embodiment of the present invention.
Figure 4:
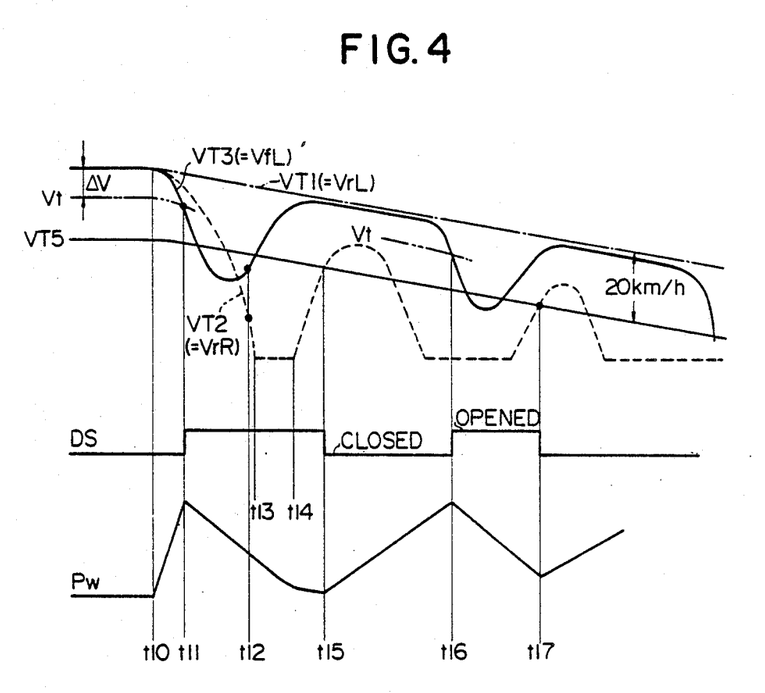
FIG. 4 is view useful for explaining the operation of the anti-skid control system shown in FIG. 3.

Referring to FIG. 3, there is shown the anti-skid control system according to an embodiment of the present invention. FIG. 4 illustrates the relationship between the wheel rotational velocity controlled through a first brake oil hydraulic channel, decay signal DS, and brake pressure Pw.

The anti-skid control system shown in FIG. 3 includes a lefthand front wheel speed sensor 1, righthand rear wheel speed sensor 2, lefthand rear wheel speed sensor 3, and righthand front wheel speed sensor 4. Output signals derived from these wheel speed sensors 1 to 4 are passed to speed computation circuits 5 to 8 which in turn compute and provide signals representing lefthand front wheel speed VfL, righthand rear wheel speed VrR, lefthand rear wheel speed VrL, and righthand front wheel speed VfR; and the lefthand and righthand rear wheel speed signals VrL and VrR are inputted to selector circuits 9 and 10 respectively so that the higher one of the two wheel speeds is slected in the selector circuit 9 ("select high") as a first computed speed VT1, while the lower one of the two wheel speeds is selected in the selector circuit 10 ("select low") as a second computed speed VT2. Assuming that the lefthand wheels running road surface represents higher friction while the righthand wheels running road surface exhibits lower friction, the following relationships hold while the brake pressure Pw is being controlled:

$$VT1 = VrL$$

$$VT2 = VrR$$

Subsequently, the first computed speed VT1 (=VrL) and lefthand front wheel speed VfL are inputted to a third selector circuit 11 and the lower one of the two speeds is selected therein ("select low") as a third computed speed VT3 (=VfL). Similarly, the first computed speed VT1 (=VrL) and righthand front wheel speed VfR are inputted to a fourth selector circuit 12 and the lower one of the two speeds is selected therein as a fourth computed speed VT4. In a reference speed setting-up circuit 13, a reference speed VT5 is set up on the basis of the first computed speed VT1 (=VrL) in such a manner that it is lower than the first computed speed VT1 (=VrL) by a predetermined amount, say 20 km/h and follows the first computed speed with such a speed difference (VT5=VT1−20 km/h), as shown in FIG. 4. The speeds VT2, VT3, and VT5 are inputted to a control logic circuit 14 which controls a modulator 15 associated with the first brake oil hydraulic channel. The speeds VT2, VT4 and VT5 are inputted to a control logic circuit 16 which controls a modulator 17 associated with the second brake oil hydraulic channel.

In the control logic circuit 14 of the first brake oil hydraulic channel wherein the lefthand front wheel speed VfL and righthand rear wheel speed VrR are controlled, as will be seen from FIG. 4, the third computed speed VT3 equal to the lefthand front wheel speed VfL which is decreased as a result of the brake pressure being increased from time t10, is controlled while being compared with reference wheel speed Vt which is set up in the control logic circuit 14 on the basis of the third computed speed VT3 and so as to follow the latter in a manner similar to that described above in connection with FIG. 1. At time t11 when the computed speed VT3 and reference wheel speed Vt become equal to each other, the decay signal DS is generated so that reduction of the brake pressure Pw is thereby started. If the second computed speed VT2 equal to the righthand rear wheel speed VrR which is being decelerated, is higher than the reference speed VT5 at time t12 when there occurs 15% recovery of the computed speed VT3 from a low-peak point where the computed speed VT3 decreased as the result of the brake pressure reduction is changed from deceleration to acceleration, then the reduction of the brake pressure Pw is stopped at the time t12 and the brake pressure Pw is held, as in FIG. 1. On the other hand, if the computed speed VT2 (=VrR) which is being decelerated, is lower than the reference speed VT5 at the time t12 as shown in FIG. 4, then the brake pressure reduction is continued, instead of being stopped at the time t12, so that the computed speed VT2 is further decreased, and thus the wheel tends to be temporarily locked at time t13. Since the reduction of the brake pressure Pw is being continued, however, the computed speed VT2 (=VrR) is accelerated at time t14; and at time t15 when the computed speed VT2 goes above the reference speed VT5, the brake pressure reduction is stopped, and the brake pressure Pw is increased with a rate which depends on the recovery condition of the computed speed VT3 (=VfL). At time t16 when the computed speed VT3 (=VfL) goes below the reference wheel speed Vt, the decay signal DS is generated so that reduction of the brake pressure Pw is started again; and at time t17 when the computed speed VT2 (=VrR) goes above the reference speed VT5, the brake pressure reduction is stopped and the brake pressure is increased.

As will be appreciated from the above discussion, according to the present invention, the righthand rear wheel running on the lower frcition road surface and associated with the first brak oil hydraulic channel may temporarily be locked, but can be prevented from being completely locked and is enabled to recover from the temporary locked condition by virtue of the continued reduction of the brake pressure, while the lefthand front wheel running on the higher friction road surface is braked, although the braking force is slightly over-relieved; thus, even when the vehicle is running on a "split $\mu$" road surface, it is possible to secure running stability as well as to shorten the braking distance during braking operation. Anti-skid control with respect to the righthand front wheel and lefthand rear wheel associated with the second brake oil hydraulic channel is similar to that described above in connection with the first brake oil hydraulic channel, and therefore an explanation thereof will be omitted.

Figure 5:
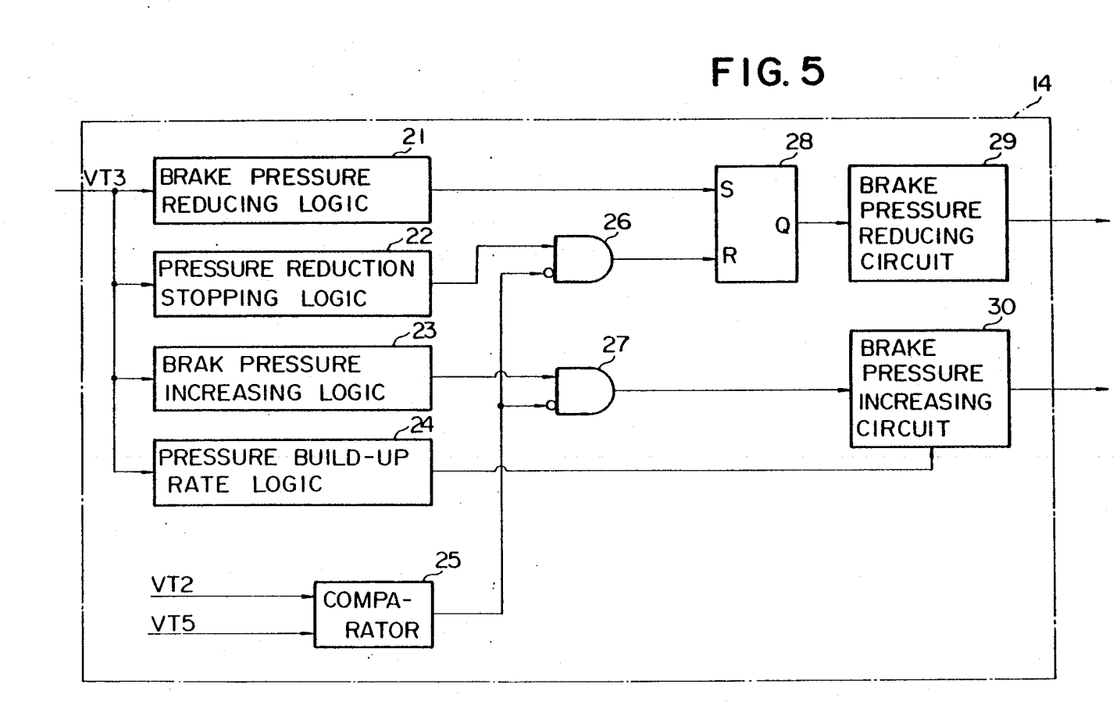
FIG. 5 is a view illustrating a control logic circuit arrangement usable with the present anti-skid control system of FIG. 3.

Referring to FIG. 5, there is shown an example of the arrangement of the control logic circuit 14 shown in FIG. 3, which comprises a pressure reduction starting logic circuit 21, pressure reduction stopping logic circuit 22, pressure increasing logic circuit 23, pressure buildup rate setting circuit 24, comparator circuit 25, AND gate circuits 26 and 27, flip-flop circuit 28, pressure reducing circuit 29, and pressure increasing circuit 30. The third computed speed VT3 (=VfL) is inputted to the pressure reducing starting logic circuit 21, pressure reducing stopping logic circuit 22, pressure increasing logic circuit 23 and pressure buildup rate setting circuit 24, and the second computed speed VT2 (=VrR) and reference speed VT5 are compared in the comparator circuit 25. The output of the pressure reduction stopping logic circuit 22 is passed to one of the terminals of the AND gate 26, and the output of the pressure increasing logic circuit 23 is applied to one of the terminals of the AND gate 27. The other terminals of the AND gates 26 and 27 serve as inverting terminals, and the output of the comparator 25 is applied to the inverting terminals. The output of the pressure reducing logic circuit 21 is applied to the set terminal S of the flip-flop 28, and the output of the AND gate 26 is provided to the reset terminal R of the flip-flop 28. The Q terminal of the flip-flop 28 is connected to the pressure reducing circuit 29, and the output terminal of the AND gate 27 is coupled to the pressure increasing circuit 30. The comparator circuit 25 is arranged such that the second computed speed VT2 and reference speed VT5 are compared therein and "1" output is provided when VT2≦VT5.

With the above arrangement, when the third computed speed VT3 (=VfL) becomes equal to the reference wheel speed Vt (at the time t11 in FIG. 4), the output of the pressure reducing circuit 21 becomes "1" so that the flip-flop 28 is set and thus the ouptut at the Q terminal thereof also becomes "1". As a result, the pressure reducing circuit 29 is operated so that pressure reduction is started. At the time t12 when there occurs 15% recovery of the third computed speed VT3 from the low peak, the output of the pressure reduction stopping logic circuit 22 becomes "1", and when VT2>VT5, the output of the comparator 25 is "0"; under such a condition, the AND gate 27 is rendered conductive, and thus at the time t12, the flip-flop 28 is reset so that the pressure reduction is stopped and the brake pressure is held as in FIG. 1. When a high peak of the third computed speed VT3 is reached, the output of the pressure increasing logic circuit 23 becomes "1"; in such a state, if VT2>VT5 then the AND gate 27 is rendered conductive, so that the pressure increasing circuit 30 is operated, and as a result, the brake hydraulic pressure Pw is increased with a buildup rate determined in the pressure buildup rate setting logic circuit 24.

At the time t12 when there occurs 15% recovery of the third computed speed VT3 from the low peak, the AND gate 26 is not rendered conductive if VT2≦VT5 as shown in FIG. 4; thus, the flip-flop 28 is maintained in the set condition so that the reduction of the brake hydraulic pressure Pw is continued and the second computed speed VT2 is enabled to recover. Thus, at time t15 when the second computed speed VT2 becomes equal to the reference speed VT5 (VT2=VT5), the flip-flop 28 is reset so that the pressure reduction is stopped. When the high peak of the third computed speed VT3 is reached, the pressure increasing logic circuit 23 becomes "1"; in such a state, if VT2≧VT5, then the AND gate 27 is not rendered conductive, and hence pressure buildup is not started. The pressure reduction is stopped at the time t15 when the second computed speed VT2 goes below the reference speed VT5 (VT2<VT5), and at the same time, pressure buildup is started.

Figure 6:
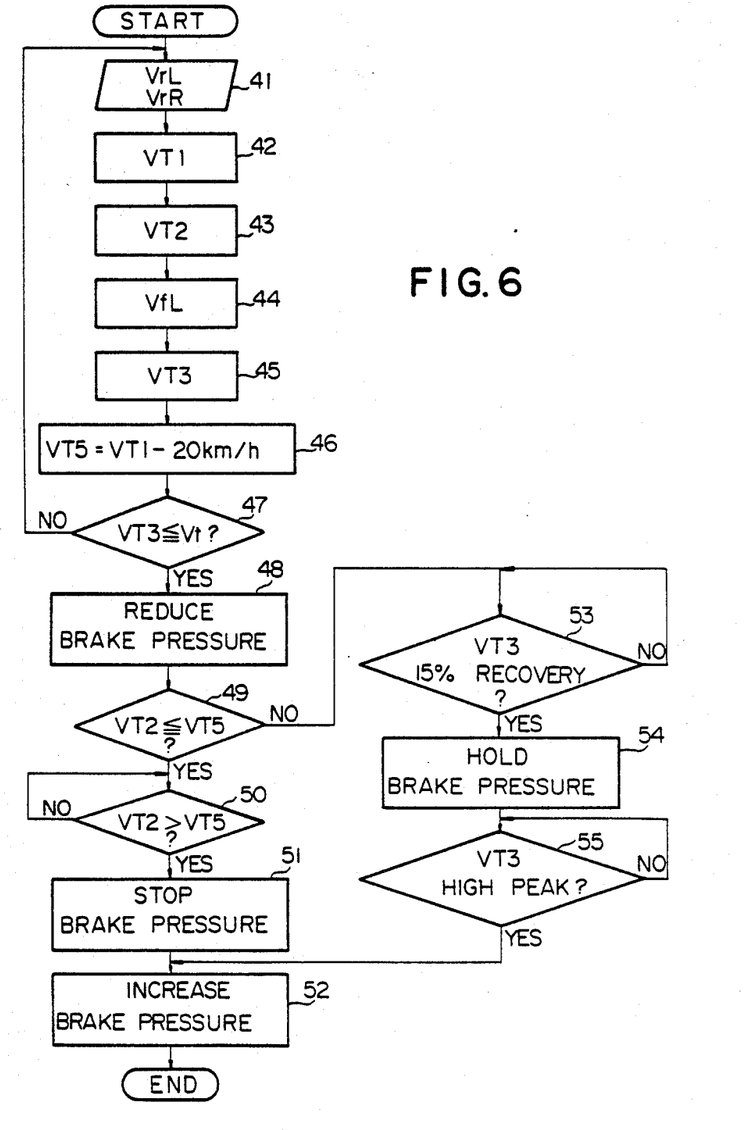
FIG. 6 is a flow chart useful for explaining the operation of the anti-skid control system according to the present invention.

FIG. 6 is a flow chart for the case where the brake hydrualic pressure Pw in the first brake oil hydraulic pressure channel is controlled in accordance with the present invention. At step 41, the righthand rear wheel speed VrR and lefthand rear wheel speed VrL is read in; at step 42, the higher one of the two wheel speeds is selected as the first computed speed VT1 (=VrL); and subsequently at step 43, the lower one of the above two wheel speeds is selected at the second computed speed VT2 (=VrR). At step 44, the lefthand front wheel speed VfL is read in; and at step 45, the lower one of the lefthand front wheel speed VfL and first computed speed VT1 (=VrL) is selected as the third computed speed VT3 (=VfL). At step 46, the reference speed VT5 is set up which is lower than the first computed speed VT1 (=VrL) by 20 km/h and follows the first computed speed with such a speed difference (VT5=VT1 −20 km/h). At step 47, judgment is made as to whether the third computed speed VT3 (=VfL) has become equal to the reference wheel speed Vt; if the result of the judgment at the step 47 is "YES", then at step 48, decay signal will be generated so that reduction of the brake hydraulic pressure Pw will be started at the time t11. At step 49, judgment is made as to whether the second computed speed VT2 (=VrR) being deceler-